(12) United States Patent
Chuang

(10) Patent No.: US 8,305,740 B2
(45) Date of Patent: Nov. 6, 2012

(54) ELECTRONIC DEVICE

(75) Inventor: Chih Wei Chuang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 246 days.

(21) Appl. No.: 12/878,068

(22) Filed: Sep. 9, 2010

(65) Prior Publication Data

US 2011/0063784 A1   Mar. 17, 2011

(30) Foreign Application Priority Data

Sep. 17, 2009   (CN) .......................... 2009 1 0176701

(51) Int. Cl.
*H05K 13/00* (2006.01)

(52) U.S. Cl. ............ 361/679.01; 16/40; 16/42 R; 16/44; 16/29; 248/125.1; 248/125.2; 248/125.3; 248/125.7

(58) Field of Classification Search ............ 16/40, 42 R, 16/44, 29; 361/679.01; 248/125.1, 125.2, 248/125.3, 125.7, 125.8, 125.9, 133, 371, 248/397
See application file for complete search history.

(56) References Cited

U.S. PATENT DOCUMENTS 5,704,581 A * 1/1998 Chen ........................ 248/371

FOREIGN PATENT DOCUMENTS

CN      1375754 A    10/2002
CN    201039610 Y     3/2008

OTHER PUBLICATIONS

English translation of abstract of CN 201039610.
English translation of abstract of CN1375754.

* cited by examiner

*Primary Examiner* — Jayprakash N Gandhi
*Assistant Examiner* — Hung Dang
(74) *Attorney, Agent, or Firm* — Thomas, Kayden, Horstemeyer & Risley, LLP

(57) ABSTRACT

An electronic device includes a body with a slide member, a supporter connected to the slide member to support the body placed on a plane, and a fastener combining the supporter and the slide member to make the supporter locate at a first position of the slide member. When the body is applied a force, the supporter moves along the slide rod to locate at a second position to adjust an angle between the body and the plane.

8 Claims, 9 Drawing Sheets

ELECTRONIC DEVICE

CROSS-REFERENCES TO RELATED APPLICATIONS

This non-provisional application claims priority under 35 U.S.C. §119(a) on Patent Application No. 200910176701.X filed in China P.R.C. on 2009 Sep. 17, the entire contents of which are hereby incorporated by reference.

BACKGROUND OF THE INVENTION

1. Field of the Invention

The invention relates to an electronic device, and more particularly, to an electronic device with a moveable supporter.

2. Description of the Related Art

An electronic device with a display provides wide application. For example, all the conventional computer systems need to be operated via extra devices to execute a program and display the program on the display. However, with the development of science and technology, the display can display images and be touch controlled at the same time.

Conventionally, if users want to adjust the angle of a display, strong force needs to be applied to adjust the supporter of the display. Furthermore, it is inconvenient because users often have to adjust the angle with both two hands. Conventionally, the supporter is connected to the display via a pivot, and adjusted by the pivot. The pivot is usually assembled via a torsion spring structure, and the position of the display cannot be adjusted well.

Conventionally, the whole display is supported via a single supporter. When the user touches the display with one hand, the display is disposed unstable. As a result, it's inconvenient to adjust the display with single hand. It even affects the eyesight of a user due to the unsteadiness of the display.

Moreover, the common supporter of the display is solid, and the solid surface of the supporter is placed at the plane. Consequently, the manufacture cost of the supporter is high, and the supporter is heavy and occupies much space, which is inconvenient in using.

BRIEF SUMMARY OF THE INVENTION

The invention provides an electronic device including a body with slide member on the back, a supporter connected to the slide member for supporting the body on the plane, and a fastener connected to the supporter and the slide member to locate the supporter at the first position of the slide member. When the body is applied a force, the supporter moves along the slide member to locate at the second position of the slide member to adjust the angle between the body and the plane.

In an embodiment of the invention, the fastener includes an elastic element. The supporter restores to the first position from the second position via the elasticity of the elastic element. The electronic device further includes a fixing member connected to the elastic element and the body, respectively, to make one end of the elastic element to be a fixing end.

In the invention, the supporter and the body are supported by each other and placed on the plane, and a slide member is used to allow the supporter connected to the slide member to move along the slide member. The angle between the body and the plane is changed according to the different displacement of the supporter. Via the configuration of the invention, the user can adjust the angle between the body and the plane easily, and the user can operate the electronic device by touching the body more conveniently.

These and other features, aspects and advantages of the present invention will become better understood with regard to the following description, appended claims, and accompanying drawings.

DETAILED DESCRIPTION OF THE EMBODIMENTS

Figure 1A:
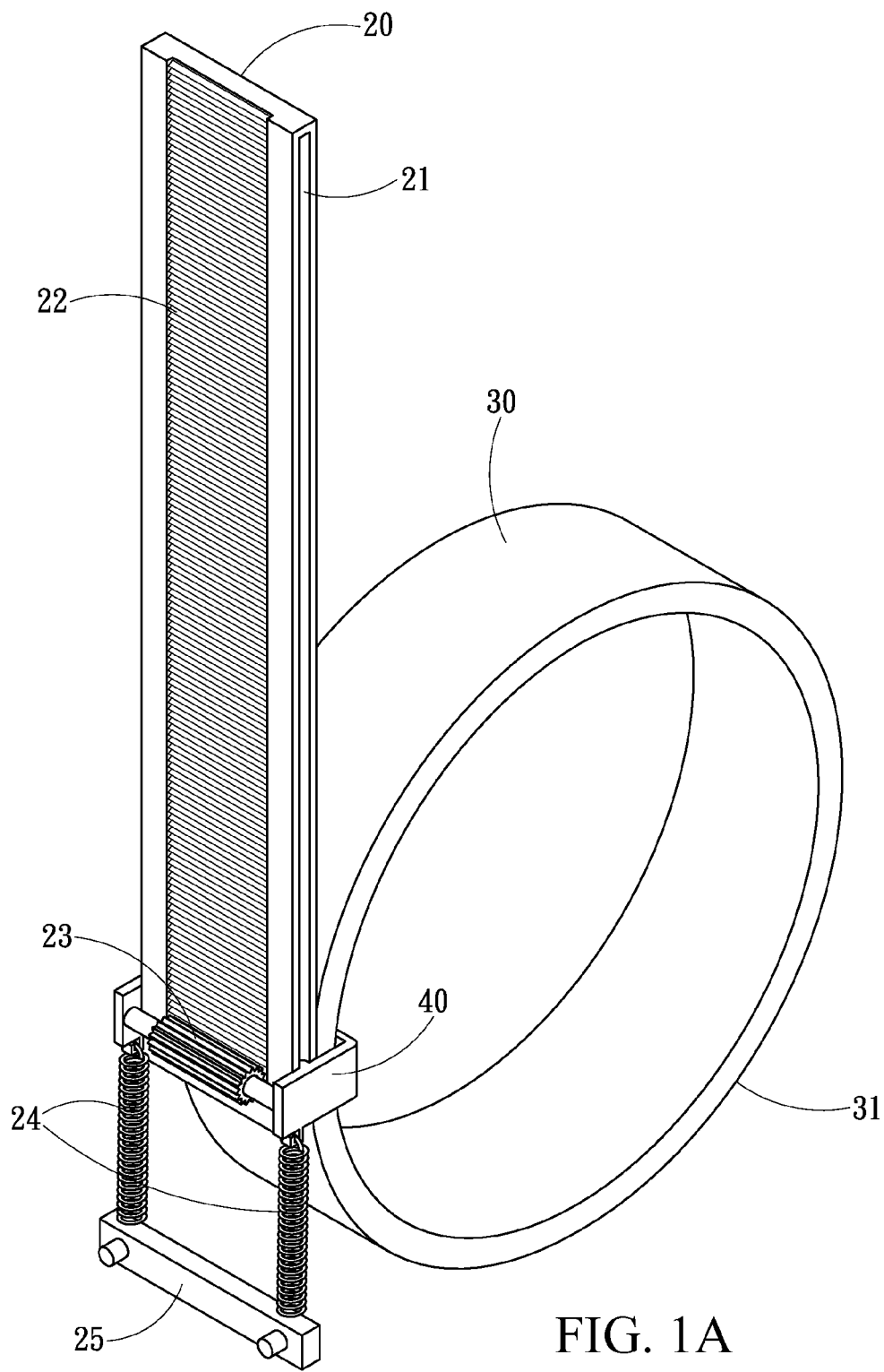
FIG. 1A is a schematic diagram showing an electronic device in a first embodiment of the invention.
Figure 1B:
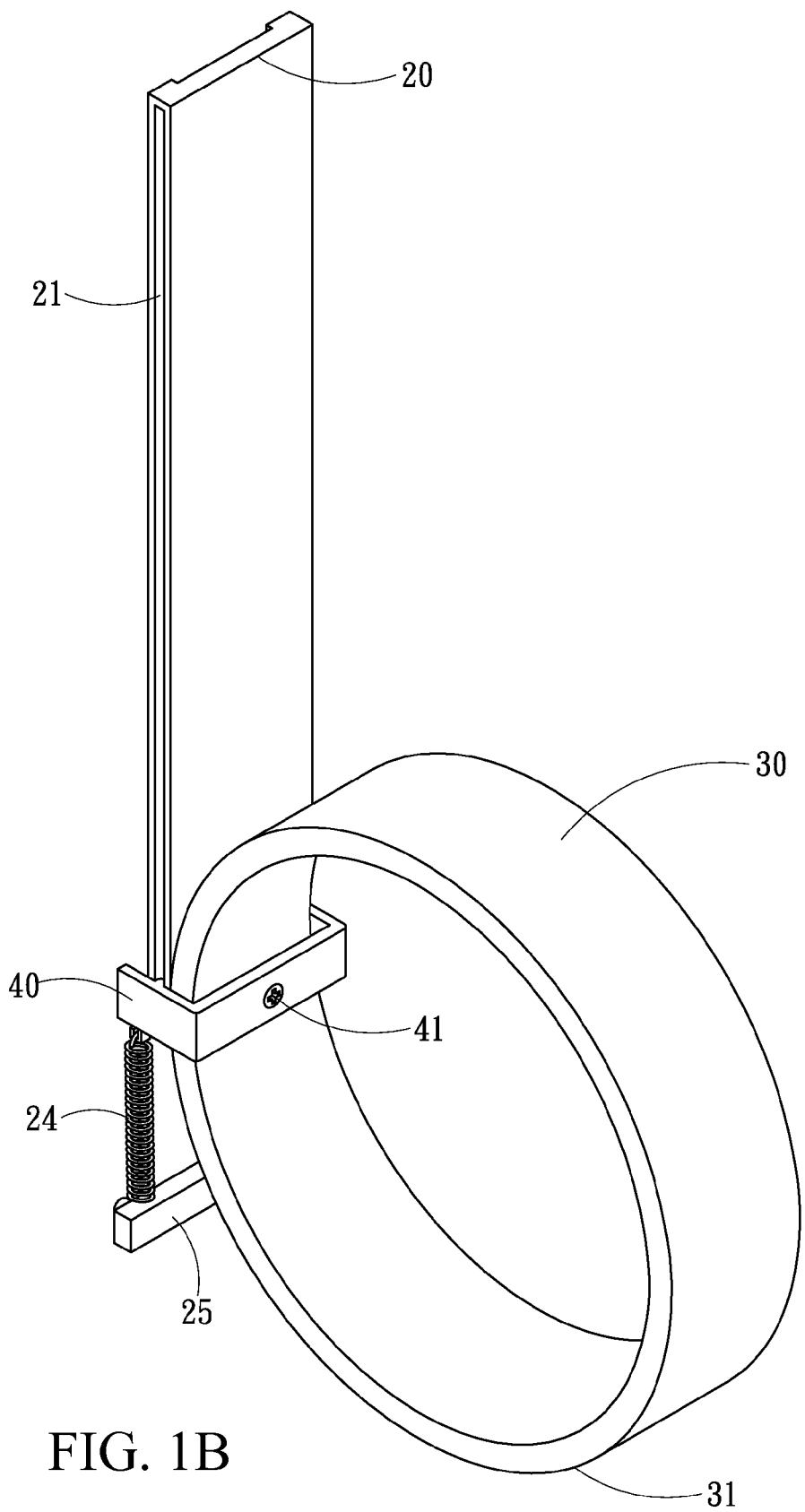
FIG. 1B is a three-dimension schematic diagram showing an electronic device in another view in a first embodiment of the invention.
Figure 2A:
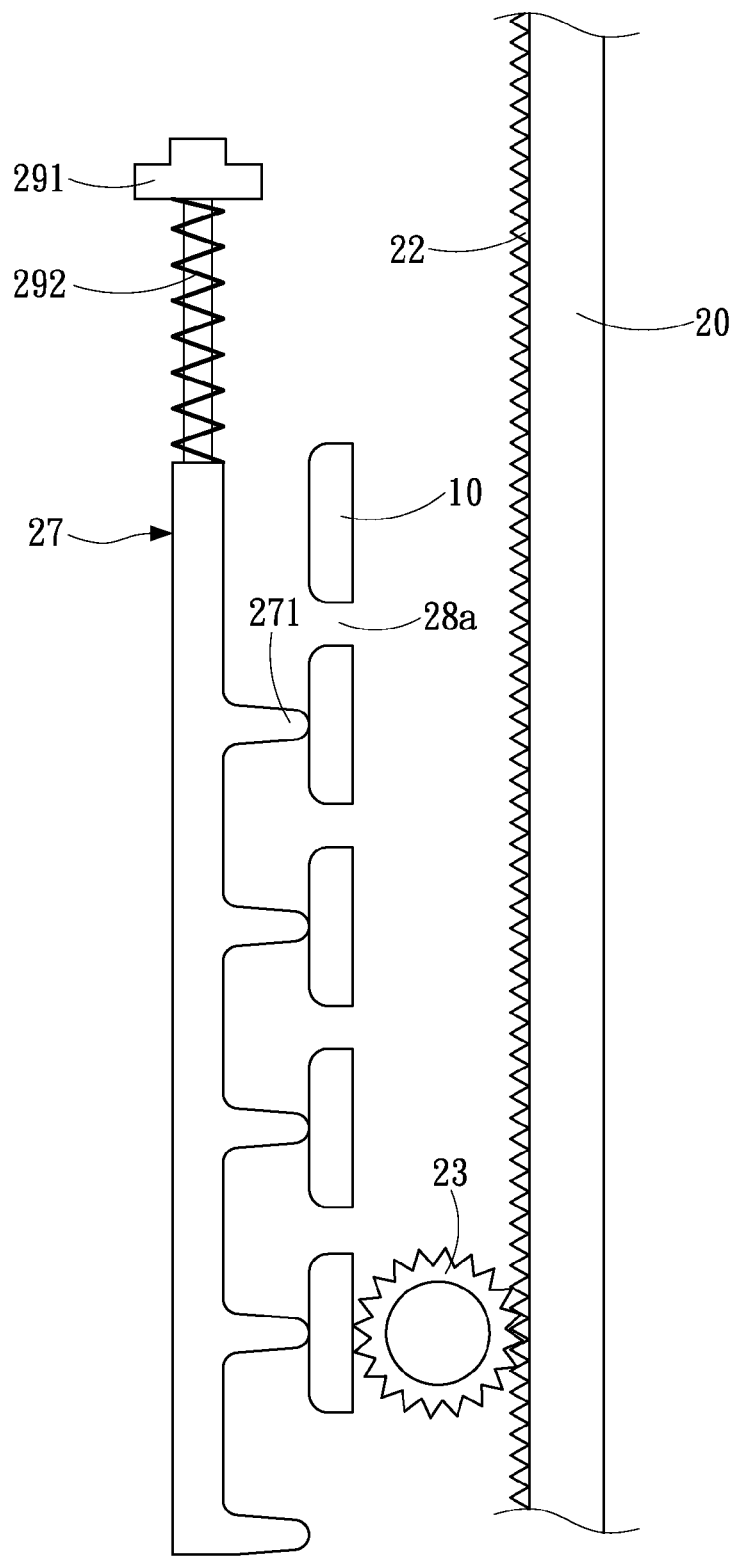
FIG. 2A and FIG. 2B are schematic diagrams showing actions of an electronic device in a first embodiment of the invention.
Figure 2B:
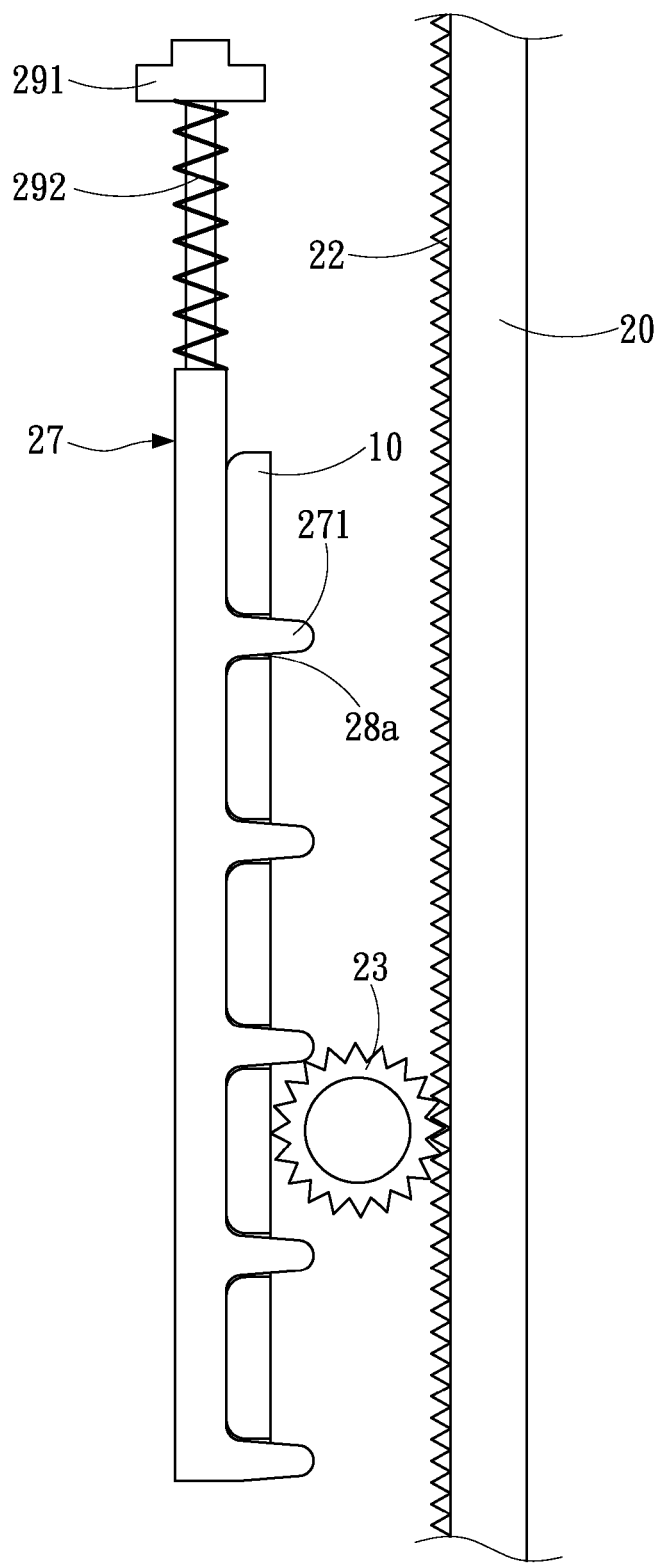
Figure 3:
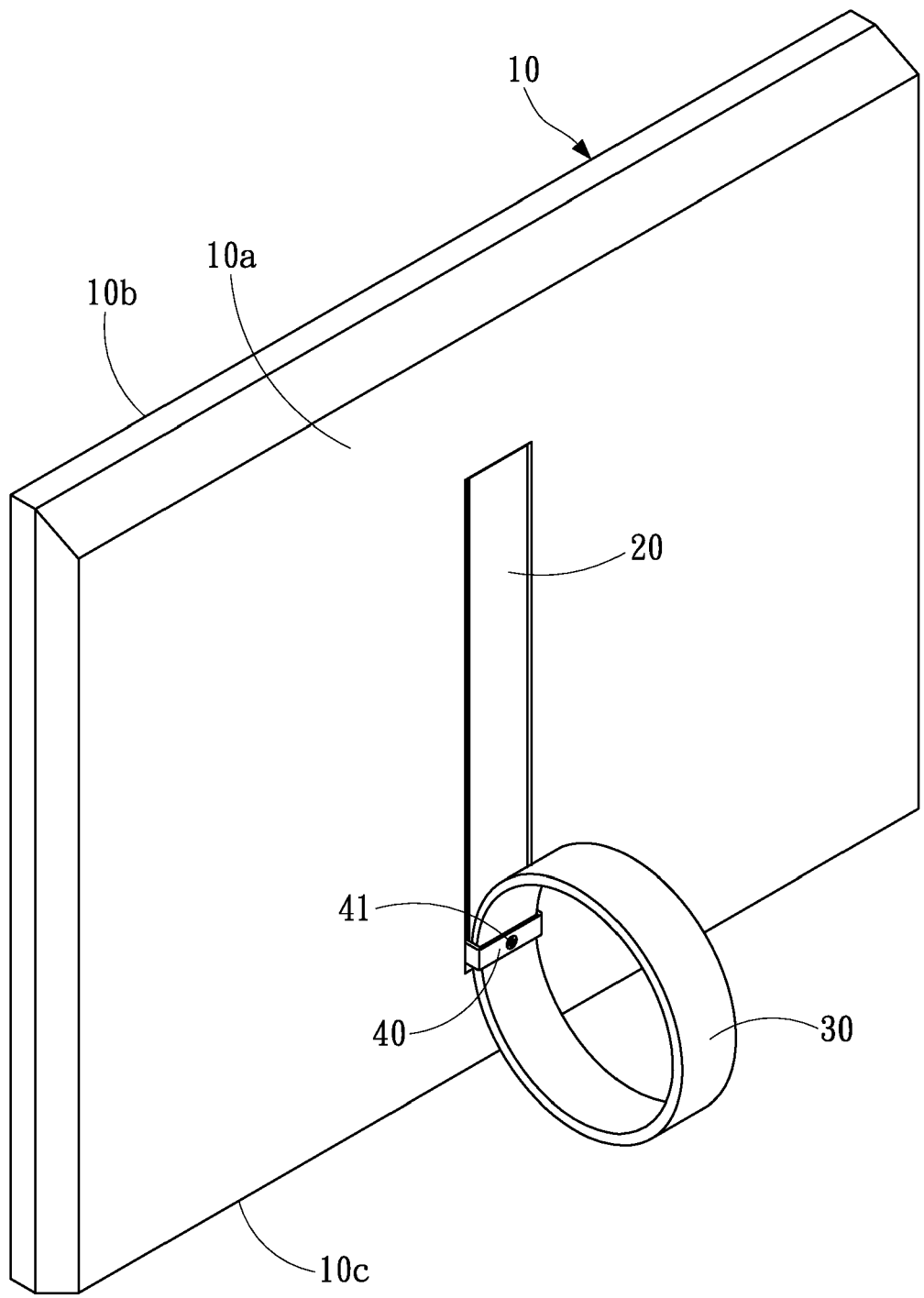
FIG. 3 is a side view showing an electronic device in a first embodiment of the invention.
Figure 4:
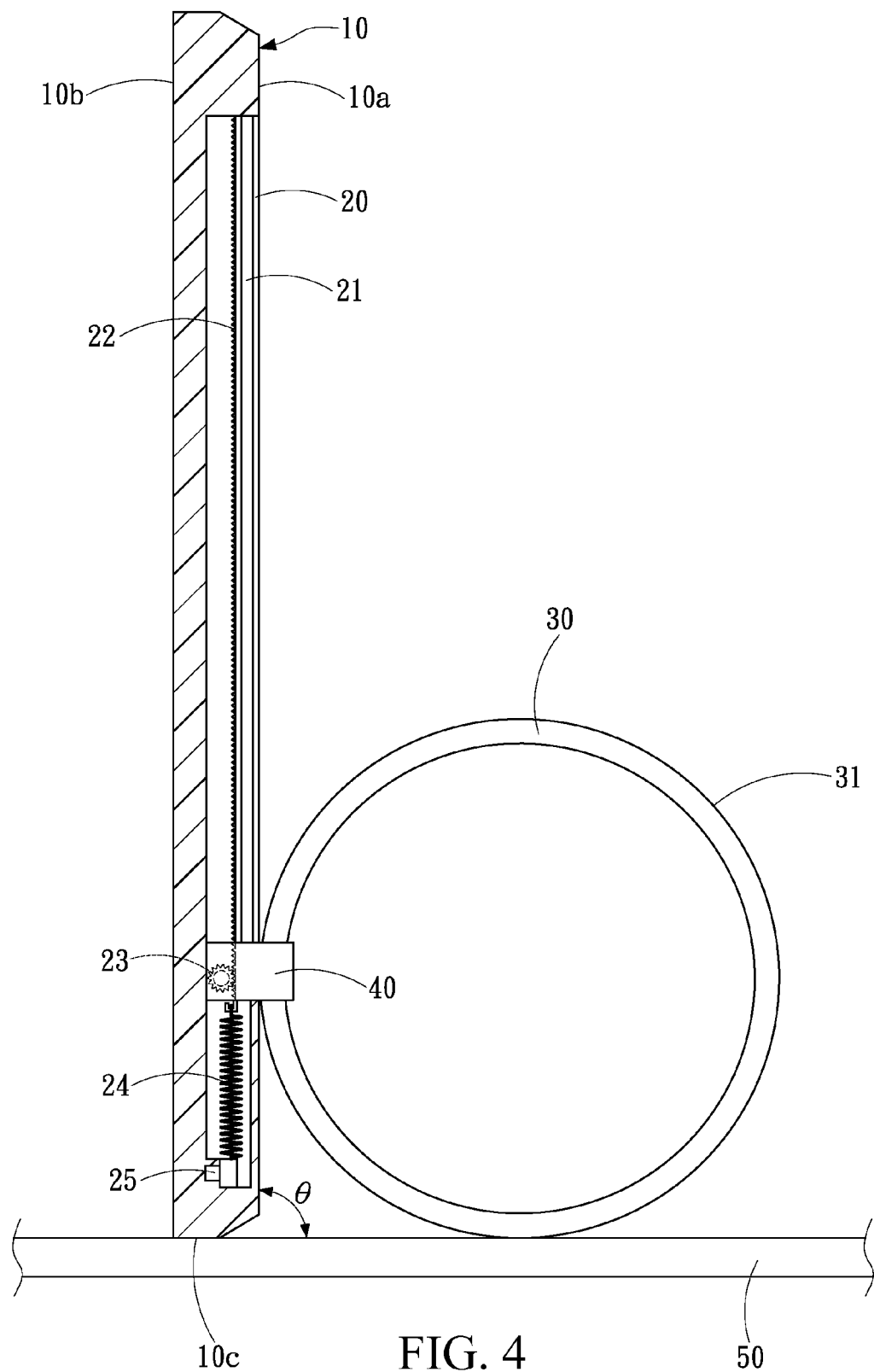
FIG. 4 is a side view showing the action of an electronic device in a first embodiment of the invention.

FIG. 1A, FIG. 1B, FIG. 2A, FIG. 2B, FIG. 3 and FIG. 4 show an electronic device in a first embodiment of the invention. The electronic device of the invention includes a body 10, a slide member 20, a supporter 30 and a fastener 40.

The body 10 is approximately rectangle in shape. A first surface 10a of the body 10 may be made of plastic. A second surface 10b is used for displaying data and transferring information. The body 10 can be disposed on a plane 50 with one side 10c contacted with the plane 50 (shown in FIG. 4).

The slide member 20 is approximately strip rectangle shaped, and preferably connected to one side 10a of the body 10. However, the invention is not limited thereto, and the slide member 20 can be disposed at any position of the body 10. The most material of the slide member 20 is the same as that of the side 10a of the body 10, and the invention is not limited thereto. The slide member 20 can be made of other smoother materials (shown in FIG. 3). The two sides of the slide member 20 include a sliding runner 21. Moreover, the connecting surface between the slide member 20 and the body 10 includes a rack 22 for increasing the damp of the slide member 20. The rack 22 is preferably includes a saw tooth shape, and the saw teeth are a plurality of protrusions arranged at intervals.

The main material of the supporter 30 may be metal such as an iron alloy, or plastic and other heavy material. The invention is not limited thereto. The supporter 30 is connected to the slide member 20, and the shape of the supporter 30 is not limited, as long as the supporter 30 can be connected to the fastener and contact with the plane 50 to support the body 10. The shape is preferably to be an annular hollow shape, a V-shape, and a triangle shape, which is not limited in the invention.

The fastener 40 is approximately U-shaped to connect the supporter 30 to the slide member 20. The main material may be plastic, but the invention is not limited thereto. The fastener 40 also may be made of metal or other strong materials. Moreover, the fastener 40 and the supporter 30 can be integrated, and the slide member 20 and the supporter 30 also may be locked via a locking mode such as a screw 41 (shown in FIG. 1B). The fastener 40 further includes a roller 23 disposed at one side corresponding to the supporter 30. The roller 23 is approximately cylindrical shaped. The surface of the roller 23 includes saw teeth shaped protrusions arranged at intervals. Via the contact between the saw tooth shaped protrusions and the rack 22 of the slide member 20, the damp is increased (shown in FIG. 1A).

A stopper 27 is disposed at one side of the slide member 20 and can be embedded into the body 10. The stopper 27 includes a plurality of tenons 271. The first surface 10a of the body 10 includes openings 28a corresponding to the tenons 271. The tenons 271 and the opening 28a are arranged at intervals. The tenons 271 pass through the corresponding opening 28a to locate the roller 23. One end of the stopper 27 includes a pressing component 29. The pressing component 29 preferably includes a pressing member 291 and an elastic member 292, and one end of the pressing member 291 abuts against the stopper 27 (shown in FIGS. 2A, 2B). The structure of the stopper 27 and the pressing component 29 is just an example, and the invention is not limited thereto. The slide member 20 and the stopper 27 may be integrated, and the slide member 20 can be disposed inside the body 10 with the stopper 27 disposed outside the body 10.

The invention further includes an elastic element 24. One end of the elastic element 24 is connected to the fastener 40. The elastic element 24 may be a spring, but the invention is not limited thereto. Furthermore, the other end of the elastic element is connected to a fixing member 25. The fixing member 25 is approximately a rectangular sheet, and it is connected to one side 10a of the body 10 and close to the side 10c of the body 10 to make one end of the elastic element 24 of the fixing member 25 to be a fixing end.

In the electronic device of the invention, the body 10 and the supporter 30 supports each other, and the supporter 30 is located at the first position of the slide member 20. Consequently, the supporter 30, the side 10c of the body 10 and the plane 50 form a stable mode with three-point support. Furthermore, the stopper 27 abuts against the roller 23 of the fastener 40 to fix the supporter 30.

When the user wants to change the angle of the body 10, he or she pushes the body 10, and the body 10 presses the supporter 30 at the same time. Then, the supporter 30 generates a reaction force to the fastener 40. Since the fastener 40 is connected to the slide member 20, the fastener 40 moves along the sliding runner 21 of the slide member 20 due to the effect of the reactive force. At the same time, one end of the elastic element 24 connected to the fixing member 25 is a fixed end. The other end of the elastic element 24 is connected to the fastener 40. Thus, when the fastener 40 moves relative to the slide member 20, the elastic element 24 is pulled simultaneously.

Figure 5:
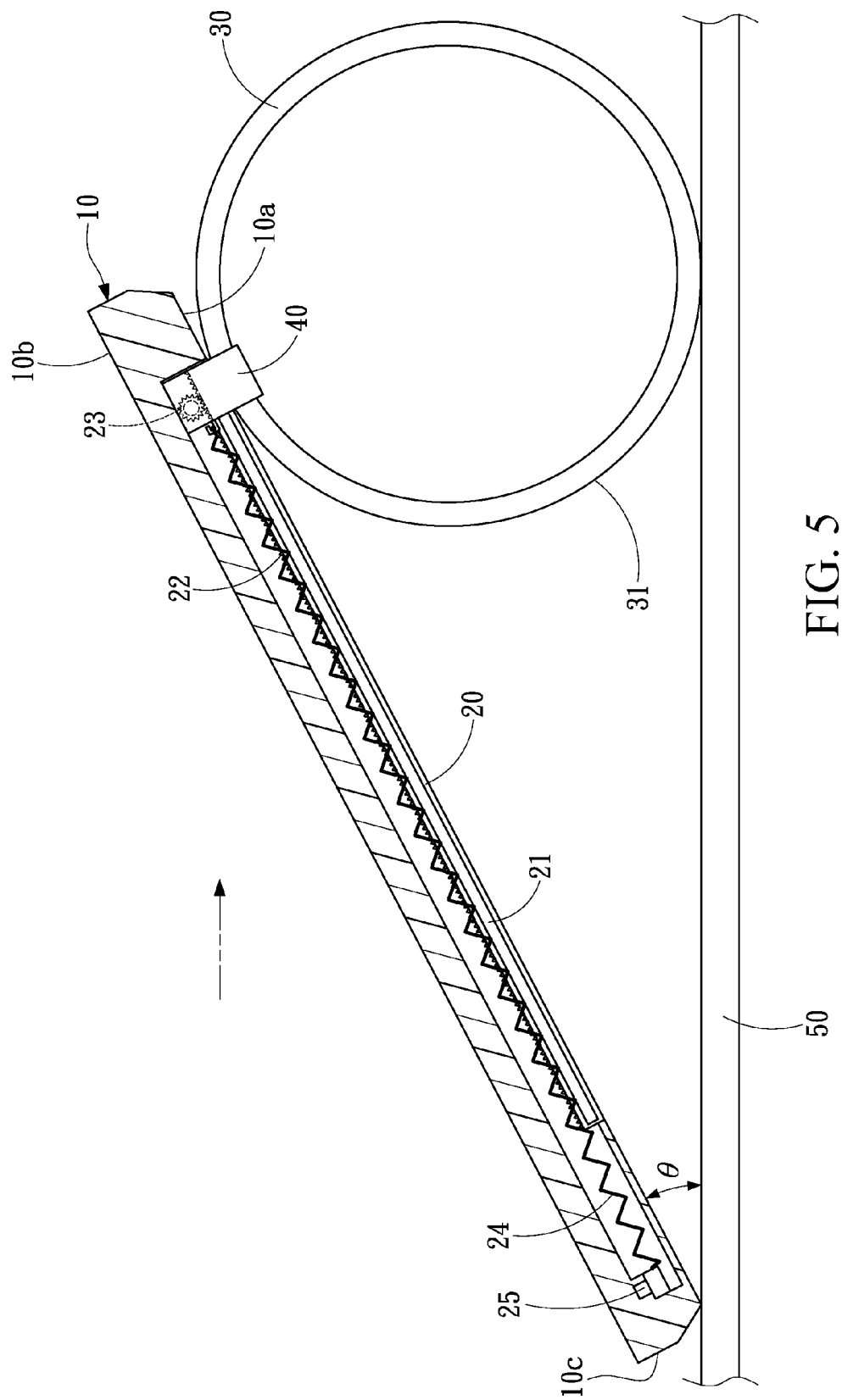
FIG. 5 is a schematic diagram showing an electronic device in a first embodiment of the invention.

Additionally, the fastener 40 moves along the slide member 20 to make the supporter 30 to move along the slide member 20 at the same time. Meanwhile, the user can press the pressing component 29 to drive the tenons 271 of the stopper 27 to slide into the corresponding openings 28a. The adjacent two tenons 271 block the roller 23 to locate the roller 23 between the adjacent two openings 28a of the body 10. Consequently, the supporter 30 is fixed and locates at the second position of the slide member 20, and thus the angle θ between the body 10 and the plane 50 is adjusted (shown in FIGS. 4, 5). Regardless of the change of the inclination angle θ, the supporter 30 and the side 10c of the body 10 form a three-point stable support on the plane 50.

When the user wants to restore the body 10, he or she can press the pressing component 29 again. The pressing component 29 drives the tenons 271 of the stopper 27 to slide out of the corresponding openings 28a, and then the tenons 271 unblock the roller 23 to allow the roller 23 to move along the slide member 20. At the same time, the user should pull the body 10. Since one end of the elastic element 24 is fixed at the fixing member 25, the elastic element 24 restores to the original statement via elasticity of the elastic element 24. Meanwhile, the fastener 40 is driven to move along the slide member 20 to make the supporter 30 to move from the second position of the slide member 20 to the first position of the slide member 20 to restore the supporter 30.

Figure 6:
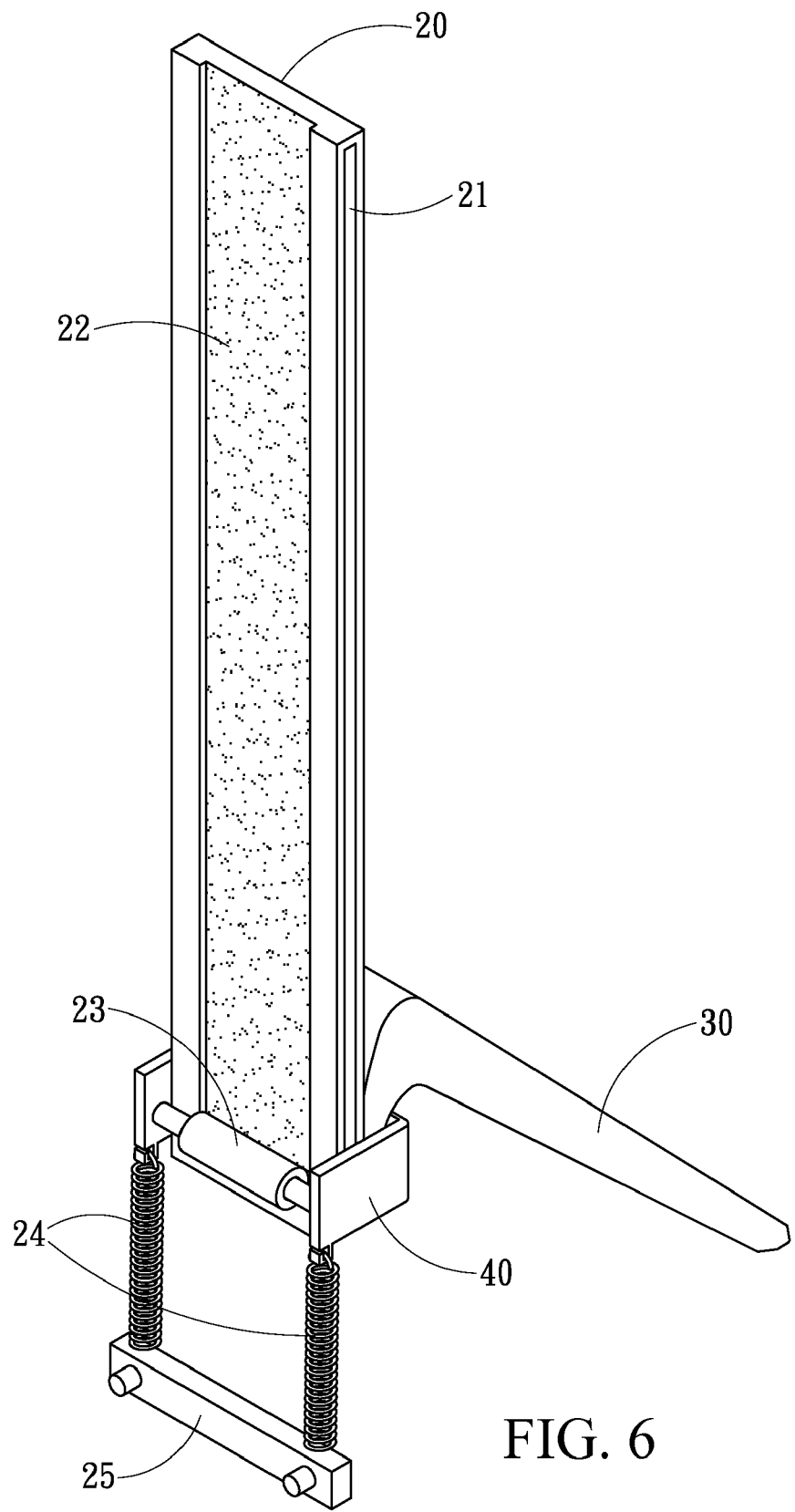
FIG. 6 and FIG. 7 are schematic diagrams showing an electronic device in a second embodiment of the invention.
Figure 7:
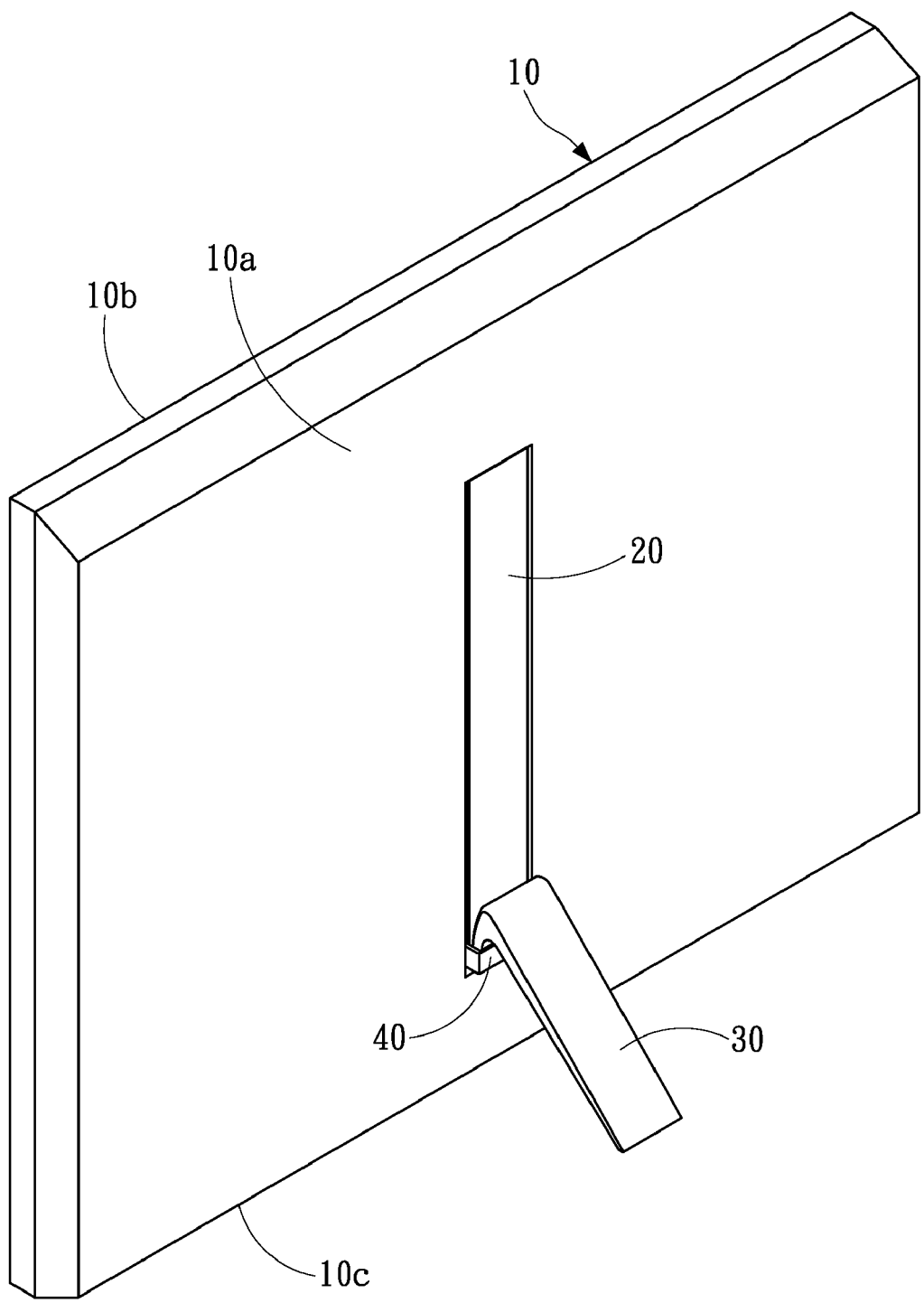

FIG. 6 and FIG. 7 show an electronic device disclosed in a second embodiment. The difference between the first embodiment and the second embodiment is the structure of the supporter 30. In the second embodiment, the supporter 30 may be a L-shaped support rob connected to the slide member 20. One end of the supporter abuts against the plane 50 to support the body 10. Another difference is the rack 22 and the roller 23. The rack 22 may be a rougher plane, and the roller 23 is a wheel with a rubber surface. Via the contact between the rack 22 and the roller 23, the damp is increased.

In the invention, a fastener is used to connect a supporter and a slide member to locate the supporter at the first position of the slide member. The invention allows the supporter to move along the slide member and locate at the second position of the slide member by pressing the body. Consequently, the angle between the body and the plane is adjusted, which is easily operated for uses. Moreover, the supporter with the structure reduces the material cost and occupies less space, which is very convenient in using.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An electronic device, comprising:
   a body having a slide member;
   a supporter connected to the slide member for supporting the body on a plane; and
   a fastener connecting the slide member to the supporter to locate the supporter at a first position of the slide member;
   wherein, when the body is applied a force, the supporter moves along the slide member to located at a second position of the slide member to adjust an angle between the body and the plane;
   wherein the slide member comprises a rack for increasing a damp of the slide member; and
   wherein the fastener comprises a roller contacted with the rack to increase the damp.

2. The electronic device according to claim 1, wherein the slide member comprises a sliding runner for allowing the fastener to move along.

3. The electronic device according to claim 1, wherein the body further comprises a stopper for blocking displacement of the roller to locate the supporter.

4. The electronic device according to claim 1, wherein the fastener comprises an elastic element, and the supporter restores to the first position from the second position via the elasticity of the elastic element.

5. The electronic device according to claim 1, wherein the supporter is an annular hollow part.

6. The electronic device according to claim 1, wherein the supporter is a support rod.

7. The electronic device according to claim 3, further comprising a pressing component abutting against the stopper and used for driving the stopper to move along the slide member.

8. The electronic device according to claim 4, further comprising a fixing member connected to the elastic element and the body, respectively, to make one end of the elastic element to be a fixing end.

* * * * *